United States Patent [19]

Akami et al.

[11] 4,017,894
[45] Apr. 12, 1977

[54] METHOD FOR PREPARING COLOR SEPARATION PRINTING PATTERNS

[75] Inventors: Hitoshi Akami, Yokohama; Shigeru Nishikawa, Aikawa; Toshio Ikeda, Kyoto; Akira Tsukokura, Joyo, all of Japan

[73] Assignees: Agency of Industrial Science & Technology, Tokyo; Daido-Maruta Finishing Co., Ltd., both of Japan

[22] Filed: Sept. 26, 1974

[21] Appl. No.: 509,499

[30] Foreign Application Priority Data

Oct. 1, 1973 Japan .............................. 48-110764
Jan. 28, 1974 Japan .............................. 49-11590

[52] U.S. Cl. ................................................. 358/80
[51] Int. Cl.$^2$ ........................................ H04N 1/46
[58] Field of Search ........................ 358/80, 78, 75

[56] References Cited

UNITED STATES PATENTS

| | | | |
|---|---|---|---|
| 3,247,815 | 4/1966 | Polevitzky | 358/78 X |
| 3,529,078 | 9/1970 | Murata | 358/75 |
| 3,604,838 | 9/1971 | Sharp et al. | 358/78 |
| 3,612,753 | 10/1971 | Korman | 358/80 |
| 3,622,691 | 11/1971 | Dailey | 358/80 |
| 3,742,129 | 6/1973 | Roberts et al. | 358/78 |

*Primary Examiner*—Robert L. Griffin
*Assistant Examiner*—Mitchell Saffian
*Attorney, Agent, or Firm*—Haight & Huard

[57] ABSTRACT

In a method of preparing color separation printing patterns from a multi-color original design, the design is irradiated by light and multi-color light components reflected from minute picture elements constituting the design are detected. The detected light components are converted to picture element data representative of the optical energy level of the reflected light corresponding to each picture element. The picture element data are stored and filtered to form quantized picture element data indicative of several series of reflected light components respectively falling within different preselected ranges of color. This is done by comparing successive picture element data to detect significant differences in energy level indicative of color changes. The reason for each substantial difference in output level is determined, e.g., pattern defect or imperfection, and the filtered picture element data are stored along with change codes indicative of the reason for the difference. The color of the filtered picture element data is identified by comparison with predetermined stored sample color data. The picture element data are then modified in accordance with the change codes to comply with particular printing conditions or to correct the determined imperfections or defects arising in the original design before the data are supplied to a photomodulator which modulates a laser beam impinging on a photosensitive film for black-and-white reproduction of a predetermined identified color of the original design.

9 Claims, 15 Drawing Figures

○ : COLOR A     ● : COLOR B

COLOR A   COLOR B   COLOR C

METHOD FOR PREPARING COLOR SEPARATION PRINTING PATTERNS

BACKGROUND OF THE INVENTION

1. Field of the Invention

This invention relates generally to the preparation of printing pattern films, and more particularly to a method of automatically preparing color separation printing pattern films from a multi-colored original design by means of digital logic.

In the additive printing process, a multi-colored original design is usually reduced beforehand into a number of black and white pattern films each containing a pattern of one color for use as color separation pattern films. The preparation of the color separation pattern films has thus far relied on manual labor of a skilled tracer who can translate the original design into an industrially useful form through precise analysis of the original design. The tracer's work usually requires strict recognition of colors and patterns constituting the original design in order to correct and clarify the imperfections or obscurities which might be contained in the original when viewed as an industrial design as well as modification and conversion of constituent patterns to adapt them to confirm to various conditions imposed by a particular printing machine, method or by a particular nature of cloth to be printed.

Typical examples of the defects of the original in an industrial design include unevenness in color and touch, undesirable overlapping of two different colors on the borders thereof, fine lines non-uniform in thickness, obscure color borders and the like. On the other hand, the examples of pattern modifications and conversions for adaptation to actual printing include pattern linking reduction or contraction of heavy color pattern areas and enlargement of light color pattern areas and separation of fine lines of a ground or base color.

As mentioned hereinbefore, it has been the conventional practice of the tracers to abstract the original patterns of the respective original colors on separate mat sheets as black and white images. The tracer's work requires meticulous skills and imposes physical and mental strains since the tracer has to work his eyes hard in recognizing and correcting imperfections such as uneven and overlapped colors and also in modifying the design to conform to the requirements arising from the actual printing process, resulting in work extremely low in efficiency.

On the other hand, there has been proposed a method of separating colors of an original design and forming patterns of the respective colors in black and white on a photosensitive film in a completely automated process with use of an analog computer. However, with the method using analog units, it is difficult to correct imperfections which might be in the original design, such as uneven colors and obscure pattern configurations, fine lines lacking uniformity in width, and to mend the pattern modifications including reductions and enlargements of particular patterns and divisions of patterns of the same color, which are usually required in the practical printing process to compensate for dye bleeding and ensure pattern linkage. The prior art method just mentioned usually employs a discharge tube as a light source in producing color separation patterns on photosensitive films. However, this is disadvantageous as the image pattern which is ultimately produced on the photosensitive film is inferior in sharpness and it is difficult to process image patterns at a high speed.

As will be gathered from the foregoing description, the color separation pattern films prepared by the existing automatic processing systems still contain latent factors which do not conform to actual printing conditions or requirements, so that it is necessary to station an operator who has high technical knowledge on the color separating pattern modifications in order to effect manually the necessary corrections and modifications at a suitable stage.

SUMMARY OF THE INVENTION

The present invention has as its object the provision of a method for preparing color separation printing pattern films from a multi-colored original design in a completely automated process, automatically recognizing and correcting defects, imperfections and obscure points in the original design and at the same time effecting the pattern modifications necessary for adapting the respective color patterns to the conditions which will be imposed in actual printing processes.

It is another object of the invention to provide a method for preparing color separation printing pattern films from a multi-colored original design in a completely automated process, wherein the patterns of the respective colors are produced on photosensitive films in accordance with the processed data by means of a laser beam under control of an acousto-optic modulator to effect the photo reproduction of the patterns at a high speed.

The method according to the present invention can be suitably carried out by a system which comprises a first stage of automatically separating the colors constituting the original design, a second stage of processing thus obtained input color data and a third stage of tracing processed color data. More particularly, in the first stage, a multi-colored original design is scanned, resolving a reflected light from the original into tricolor information, which information is then digitized to produce a primary color signal train; in the second stage, the color data from the first stage is processed to correct the defects and imperfections in the original design and to mend the necessary pattern modifications for adaptation to the actual printing process, as a result forming a second color signal train; and in the final tracing stage, signals of one color are extracted from the second color signal train for producing patterns of each color separately on a photosensitive film as a black and white image by irradiation of a laser beam under control of a photomodulator.

The construction and operation of the system of the invention in each of the afore-mentioned stages will be discussed hereinafter in greater detail.

The above and other objects, features and advantages of the invention will become clear from the following particular description of the invention and the appended claims, taken in conjunction with the accompanying drawings.

Figure 2:
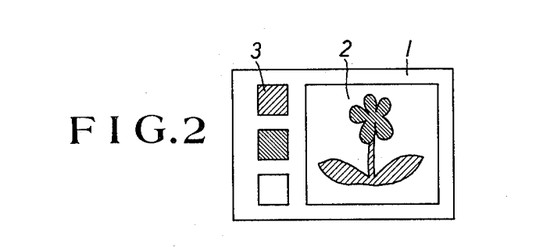
FIG. 2 is a diagrammatic plan view of an original design having color samples mounted at one side thereof.

Referring to FIG. 2, a multi-colored original 1 includes, for example, a hand-written picture 2 and sample colors 3 aligned at one side of the original design 2 to serve as initial color data. In this connection, all of the colors contained in the original picture 2 are mounted at one side of the original picture 2 as sample color 3.

Figure 1:
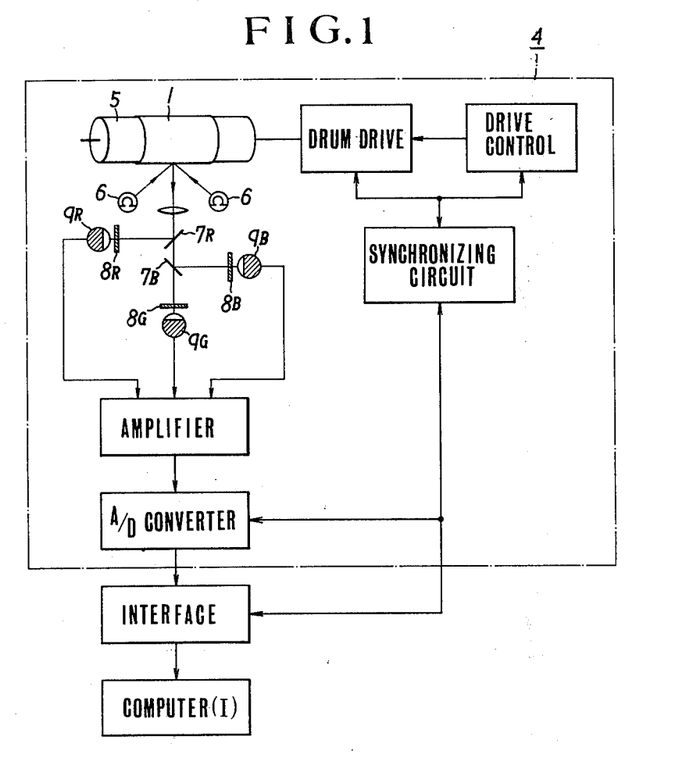
FIG. 1 is a block diagram of a system for producing color separation printing pattern films according to the present invention.

In order to separate the original colors, the original design 1 is mounted as shown in FIG. 1 on a drum 5 of a color separater 4 which has a scanning head including light sources 6, half-mirrors 7R and 7B and photocells 9R, 9G and 9B with red, green and blue filters 8R, 8G and 8B, respectively. As the drum 5 is rotated, the color separater scans the original design 1 in terms of picture element each having an area of, for example, 0.1 mm × 0.1 mm and the light reflected from each picture element is divided into three directions toward the photocells 9R, 9G and 9B to detect optical energy levels of the red, green and blue components of each picture element.

The analog color data obtained from the tricolor separation are amplified through a conventional amplifier and then digitized through an A/D converter to obtain digital signals of a number of different density levels. The A/D converter is connected through an interface to a computer (I) where picture elements having R, G and B values within a predetermined range are counted as a color signal code of one particular color, R-, G- and B-values deviating from predetermined ranges are regarded as data of an unevenly painted color or overlapped colors and actual R-, G- and B-values of the respective picture elements are output on a data storage medium such as a magnetic tape or the like, which will be herein referred to as primary color signal train for the sake of convenience. The operation by the electronic computer (1) is called preparatory compression of picture element data, but it should be discriminated from the term "compression" in conjunction with picture element data compression in the subsequent color signal processing stage. If desired, the preparatory picture data compression may be carried out in a color signal processing stage instead of using the computer (1) after A/D converter as mentioned hereinbefore.

At every revolution of the drum 5, the drum position relative to the scanning head of the color separater 4 is moved in a direction parallel to the longitudinal axis of the drum 5 by means of a drive control unit and a drum driving unit to complete the scanning of the whole surface of the original design 1 in about 20 minutes.

Figure 3:
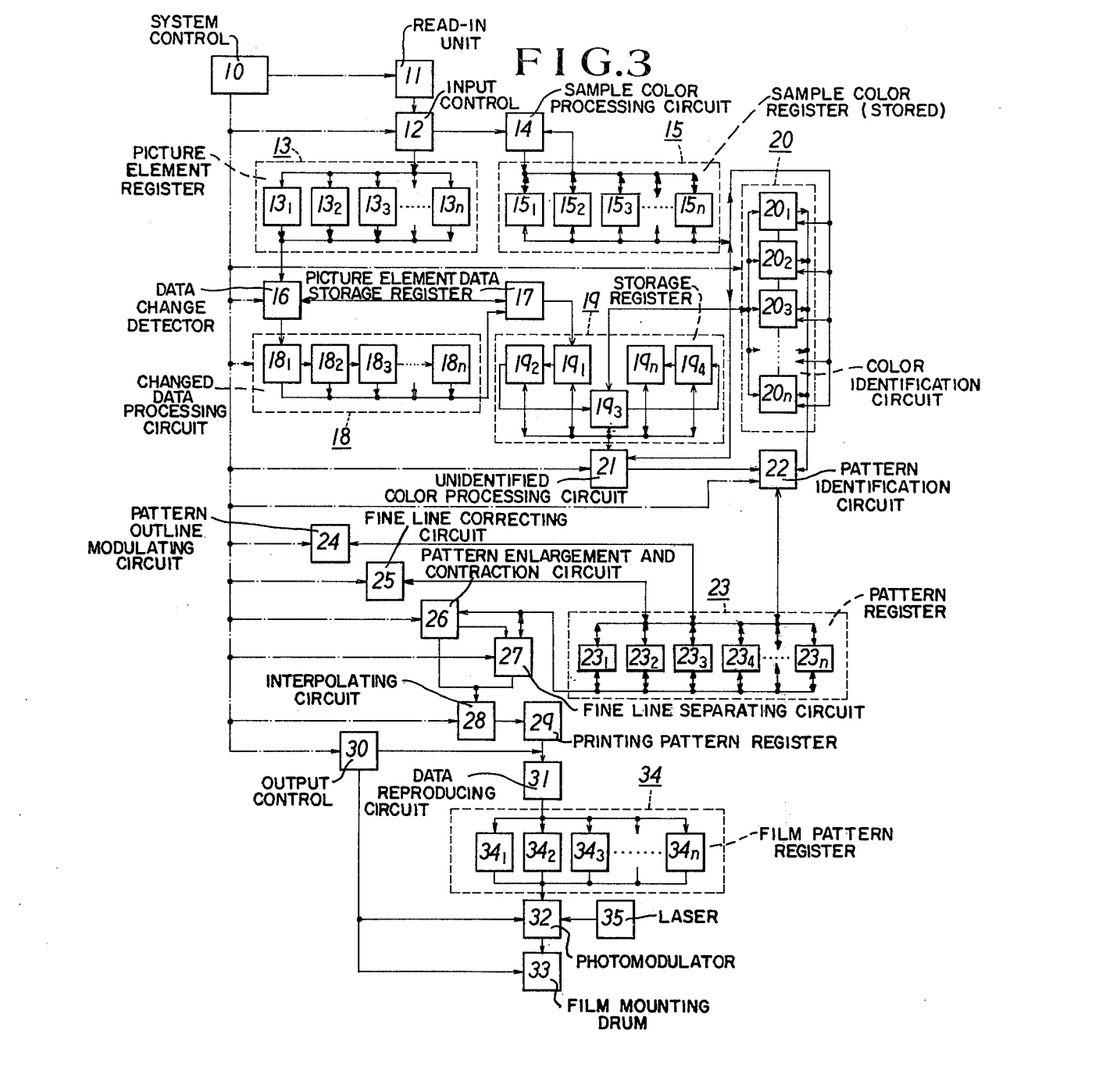
FIG. 3 is a block diagram signal flow chart of a unit for processing input color data according to the present invention.

The operations in the color data signal processing stage will now be discussed with reference to FIG. 3. In FIG. 3, the reference numeral 10 designates a software system control circuit which is employed to control the operation of the whole system.

The data of the original design and sample colors which are collected on the magnetic tape as a primary color data signal train are read by read-in unit 11, from which the original picture data signals are transmitted to a picture element register 13 while sample color data signals are transmitted to a sample color processing circuit 14, through an input control circuit 12 which determines the destinations of received signals. The data received by the sample color processing circuit 14 are transmitted to a sample color register 15, which has recorded therein beforehand with data indicative of the original colors for use in the color separation, for example, the maximum, minimum and average optical energy levels and code numbers of the respective colors, for registration in one of registers $15_1$ to $15_n$ with a corresponding color code. Upon completion of transmission of the sample color data, the sample color processing circuit 14 takes the data which have been recorded in one of the sample color registers $15_1$ to $15_n$ and re-processes them in relation to the data in other registers to facilitate the subsequent color identification.

More particularly, if there are, for example, two colors (A and B) to be separated and the sample color register 15 is required to memorize color identification data in the form of color codes and maximum, minimum and average energy levels of picture elements to be handled the identification data undergo the following re-processing operation. (At the time of transmission)

Register $15_1$ — Color code A, energy level maximum 6, minimum 3, average 4.0. Picture element energy levels received: 4, 3, 5, 6, 6, 5, 4, and so forth.

Register $15_2$ — Color code B, energy level maximum 18, minimum 15, average 16.5. Picture element energy levels received: 18, 18, 17, 16, 15, 15, 17 and so forth.

(After re-processing)

Register $15_1$ — Color code A, energy level maximum 8, minimum 1, average 4.0.

Register $15_2$ — Color code B, energy level maximum 20, minimum 13, average 16.5.

In this case, the acceptable energy ranges of the respective colors are widened by shifting the maximum and minimum levels. This is because, in two-color data separation, there is a large gap between the maximum level of the color A and the minimum level of the color B so that the sample color processing circuit 14 judges that better results are obtained by correcting the critical values, in consideration of irregularities occuring in the energy levels of the received color data.

As a result of the re-processing, it becomes possible to shorten the operation time to a considerable degree as compared with the existing methods and the operator is not required to have special knowledge in this regard. The sample colors are therefore memorized accurately by the automatic adjustment of color identification energy ranges.

It will be understood that, if desired, the data to be fed to the sample color processing circuit 14 may be sampled by an operator from the original design instead of reading the sample colors together with the original picture colors.

Upon completion of the processing of the sample color data, the input control circuit 12 transmits the original picture data for recording to the picture element data register 13.

The picture element data register 13 which records one by one the output energy data of the respective picture elements (records a plurality of color elements at one time when carried out the preparatory compression of picture elements) consists of a plurality of blocks and is connected in parallel to a data change detection circuit 16 for processing and recording the picture element data in a predetermined order. The picture element data register 13 receives data periodically from the input control circuit 12. However, the processing time subsequent to the data change detecting circuit 16 is not constant, so that the picture element data register 13 is formed from a number of blocks as mentioned hereinbefore in order to synchronize the data transmitting operation of the input control circuit 12 with the processing time subsequent to the data change detection circuit 16 on every scanning line.

The picture element data are successively taken out from the afore-mentioned picture element data register 13 by the data change detection circuit 16 for comparison with the picture element data which has been previously recorded in a picture element data storing register 17. The picture element data currently being transmitted to the change point detection circuit 16 are operated by comparison with the previous data to determine whether or not there is a change in the energy levels of the successively received picture element data. When the detection circuit 16 acknowledges a change or variation, a changed data processing circuit 18 takes over the further control of the changed picture element data. When there is no change in the received picture element data, the number of the newly scanned picture elements is added to the number previously recorded in the picture element data storage register 17, treating them as elements of the same color. Then, the data change detection circuit 16 takes out the picture element data again from the picture element data register 13.

The changed picture element data processing circuit 18 serves to process the data which have been acknowledged as changed data by the change detection circuit 16 and consists of a number of series circuits $18_1$ to $18_n$ which are previously recorded with conditions of changes which are supposed to occur with a particular original design. The changed data processing circuit 18, judging from the presumed causes of change, plots a predetermined code to groups of data which show a consistent change. On the other hand, the change point detection circuit 16 takes over the control with regard to data groups which are judged to be connected before and after the changed data. For example, the circuits $18_1$ to $18_5$ are allotted with a particular cause of change as follows:

Circuit $18_1$ — Change due to unevenly applied color;
Circuit $18_2$ — Change due to fidelity of the system;
Circuit $18_3$ — Change due to irregular original surface;
Circuit $18_4$ — Change due to overlapped colors; and
Circuit $18_5$ — Change at color boundaries.

The picture element data signal which has been judged as a change point by the picture element data change detection circuit 16 is processed while being passed from the circuit $18_1$ to circuit $18_n$ in series, thereby finding the cause of the change. This operation is continued until a data signal or a series of data signals which have been judged as a change point terminate, which deciding the nature of operations required for the changed data signals. As a result, a certain scan number is added to the picture element data storage register 17 and the data in the register 17 are transmitted to an on-line picture element data storage register 19 to set fresh data in the register 17. The changed data of the same nature are treated as one group under a predetermined change mark and recorded in the storage register 17 according to the nature of the change.

The picture element storage register 17 serves to record the data (scanned number) of a continuity of picture elements which have been identified as of the same color on a given scanning line and at the same time the output levels of the continuous picture elements. As soon as start of a different color is acknowledged by the judgement of the changed picture element data processing circuits $18_1$ to $18_n$, the previously continued picture element data are transmitted to the storage register 19 to record the fresh picture element data in the picture element storage register 17. When the received picture element data are recognized as of the same color, the scanned picture elements are added successively to the scanned number. In recording the output energy of a continuity of picture elements, the color identification is not influenced no matter whether the output energy at a given point of the continuous picture element data or an average output energy of the continuous picture elements is used. The data obtained from this operation is referred to as compressed data. The term "compressed" as used herein means filtered or quantized into relatively few discrete data levels.

The picture element data storage register 19 serves to record line by line the compressed picture element data which are transmitted from the picture element storage register 17 and has a plural number of registers $19_1$ to $19_n$ to deal with a plural number of lines for the convenience of color identification. When the changed picture element data processing circuit 18 makes a decision to transmit to the data storage register 19 the picture element data which have been recorded in the picture element data storage resister 17 (either when setting new data in the storage register 17 or when transmission of new picture element data is started), data indicative of the scanned number and the energy level of the picture elements which have been recorded in the storage register 17 are transmitted to and recorded in the storage register 19.

Figure 4A:
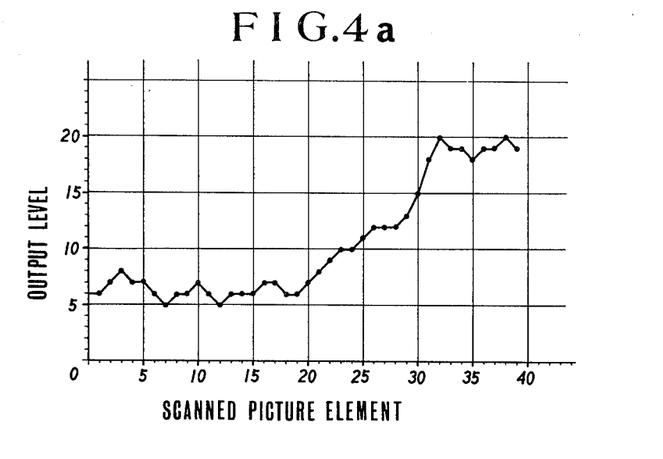
FIG. 4a is a graphical representation optical output energy distribution of picture elements on one scanning line.

The above-discussed operation will now be explained more particularly with reference to FIGS. 4a to 4c. Referring first to FIG. 4a, the picture element data of different energy levels are recorded as they are in the picture element data register 13 and sequentially taken out and processed in the changed picture data identification circuit 16. The changes as occurring at 3rd, 7th and 10th ones of the scanned picture elements are processed under the control of the changed picture element data processing circuit 18 and judged as one of a number of picture elements of the same color in the changed data processing circuits $18_1$ to $18_n$, adding the newly scanned number to the picture element data storage register 17.

On the other hand, the changes as appearing at the 21st to 32nd ones of the scanned picture elements are of the nature occurring at color boundaries or due to color overlapping and are therefore ploted with a predetermined change identification code. The data after the 33rd position are treated as a continuity of picture elements of the same color.

Figure 4B:
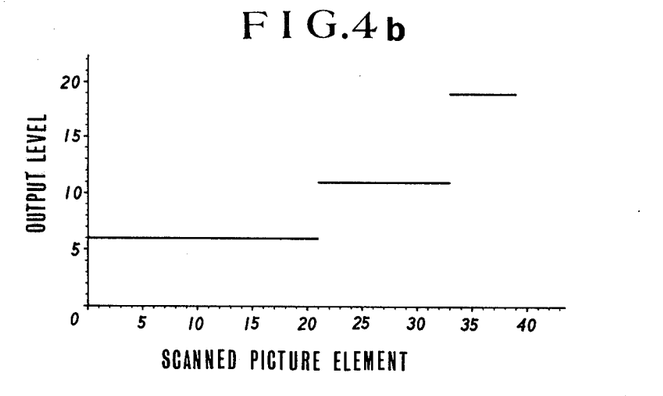
FIG. 4b is a graphical representation showing the optical energy distribution of FIG. 4a in a compressed state.
Figure 4C:
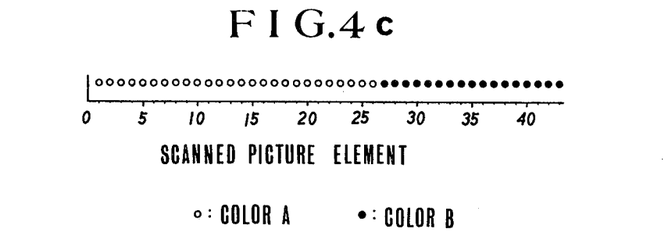
FIG. 4c is a diagram of a row of picture elements obtained by dividing the unidentified color data of FIG. 4b into two color data.

As a result, the input data of the 1st to 21st picture elements, of the 22nd to 33rd picture elements and of the 34th and succeeding picture elements are compressed into three picture element data groups as shown in FIG. 4b. The representative energy level of each group is recorded in the storage register 19, together with a change identification code with regard to the second group containing the 22nd to 33rd picture elements.

The above-described operations are characterized in that the data of continuous picture elements are recorded in a compressed form without comparing the picture elements one by one with the data recorded in the sample color register 15, so that there is no possibility of the data being compressed due to obsure picture elements.

The data compression operations are continued until all the picture element data on one scanning line are processed. This method is based on functions which are not found in the existing systems mentioned hereinbefore. With the method of the invention, it is possible to straighten out the data irregularities due to uneven colors, high scanning fidelity and surface irregularities of the original design and to remove or identify automatically the changes in data on the overlapped colors or color boundaries of the original, thereby reducing the steps required for the identification of colors and at the same time increasing the picture element data processing speed.

When all the picture element data of one scanning line are recorded in a compressed form in the data storage register 19, a color identifying circuit 20 takes over the control for the identification of the colors of the recorded color. The color identification circuit 20 takes out from the storage register 19 one line of compressed picture element data for comparison with the sample color data which are recorded in the sample color registers $15_1$ to $15_n$ and consists of a plural number of circuits $20_1$ to $20_n$ to provide multiple-stepped color identification to compensate for insufficient color identification which would otherwise occur.

The registers $19_1$ to $19_n$ are normally connected in a ring shape to transfer the data from $19_3$ to $19_4$, from $19_2$ to $19_3$ and from $19_1$ to $19_2$ every time one line of data is processed. Therefore, it is desirable to use a centrally located register for the color identification. In the following description, the register $19_3$ is used by way of example for the color identification, that is to say, the colors of the compressed picture data in the register $19_3$ are identified by the color identification circuit 20 through comparison with the sample color data in the register 15. Compressed picture element data capable of color identification are transmitted to a pattern identification circuit 22 along with the color code of the sample color register 15 and the number of scanned picture elements.

Compressed picture element data incapable of the color identification in the circuit 20 are transmitted to an unidentified color data processing circuit 21 where the color is judged in consideration of the change point signal, data in the sample color register 15 and data in the preceeding and succeeding lines in the registers $19_1$, $19_2$ and $19_4$ to $19_n$. In the circuit 21, unidentified data at the color boundaries and overlapping are divided or processed to restore optimum patterns. The data are then transmitted to the pattern identification circuit 22 together with a color code of the sample color register 15 and a number of scanned picture elements.

Assuming that the compressed picture element data of FIG. 4b are now recorded in the register $19_3$, the data is compared by operation with the sample color data in the sample color register 15 to identify the color of the picture data. In this particular instance, the first 21 picture elements on the scanned line are plotted with a code of color A while the 34th and succeeding picture elements are plotted with a code of color B, which are recorded in the pattern identification circuit 22. However, the data regarding the 22nd to 33rd picture elements are exempted from the processing in the color identification circuit 20 (in consideration of the change signal) and their control is taken over by the unidentified color processing circuit 21. In the unidentified color processing circuit 21, the data are restored to optimum patterns in consideration of the change signal (in this case, the data are divided into two halves and restored to the adjacent colors A and B). The processed color data are then transmitted to the pattern identification circuit 22.

With the above-described system arrangement, the uneven color data due to a visual or optical color variation in the original are processed to restore uniformity and unidentified data in the color boundaries or overlapped color areas are automatically divided and restored to an originally intended color, while removing impure data, so that it becomes possible to process the resolved color data at a high speed by attendance of an operator who does not have special technical experience in system operations.

The pattern delineation circuit 22 defines the final configuration of the patterns by interpolating the data as obtained from the unidentified color processing circuit 21 and the color identification circuit 20 with use of a predetermined coefficient, collecting the configurated pattern data in a pattern register 23 to indicate the pattern configuration. The pattern data preceding those of scanned a current line are recorded pattern by pattern in the pattern register 23 by the operation of the pattern identifying circuit 22 which adds the pattern data of a currently scanned line to the preceding data in the pattern register 23 or records the same as a new pattern in the register 23.

The pattern register 23 is employed to record continuous pattern data which have been identified in the pattern identification circuit 22, including a data means for indicating the code number and the pattern configuration of a color in question.

Figure 5A:
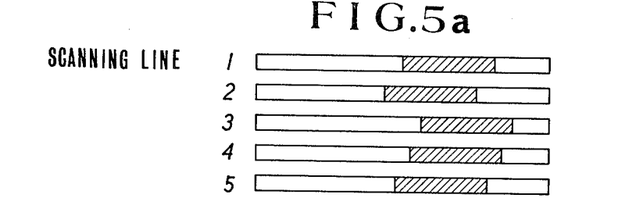
FIGS. 5a and 5b are diagrams employed to explain the pattern configurating operation according to the invention.
Figure 5B:
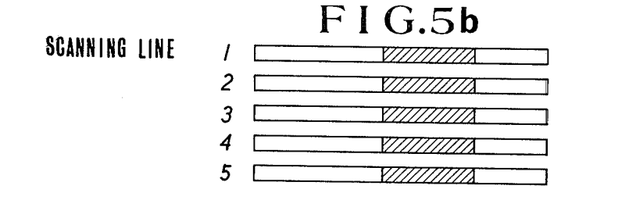

A pattern outline modulating circuit 24 serves to take out the data pattern by pattern from the register 23. The taken-out data are returned to the register 23 after adding necessary alterations to the data which dictate the pattern configuration. In other words, the pattern outline modulating circuit 24 has a function of smoothing out the pattern outlines. This will be understood more clearly from consideration of FIG. 5 where FIG. 5a shows the data in the register 23 which has not yet been passed through the pattern configurating circuit 24 while FIG. 5b shows the data which has been returned to the register 23 after having outlines smoothed out by the pattern configurating circuit 24.

The original design is generally drawn with an ink or poster colors on a sheet of paper which more or less has surface irregularities. When the original design is separated into fine picture elements, the picture elements forming the outlines of the pattern often lack clarity due to bleeding of the paint or rough touch of a painting brush. In the present invention, obscure data due to these defects in the original design are straightened automatically, though it has been difficult to attain with the existing systems.

A fine line correcting circuit 25 is provided for taking out exclusively the code signals of fine lines from the pattern data in the register 23 for the purpose of correcting the fine lines to have a predetermined width. As the fine line data are recorded in the register 23 in the form of a continuous pattern, the width of the fine line is calculated on the basis of the continuous pattern, which is reduced or increased to a predetermined width before being recorded again in the pattern register 23. In this instance, if necessary, the patterns of the adjacent colors are also corrected to compensate for the reduction or enlargement of the fine line width. As a result, the fine lines are reproduced in a uniform width to make the reproduced picture image clean and clear.

A pattern enlargement and contraction circuit 26 is provided for taking out a pattern from the pattern register 23 for enlarging the pattern area in a predetermined degree toward and over the adjacent patterns when it has a color lighter than adjacent colors while contracting the darker adjacent colors. Of course, when the taken out pattern is of a dark color, it is contracted away from an adjacent pattern of a light color which is instead enlarged toward and over the contracted dark color pattern. The data resulting from this operation are transmitted to a fine line separating circuit 27 which functions to separate a fine line of a color same as the ground.

Figure 6A:
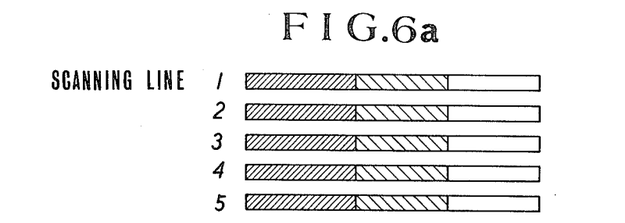
FIGS. 6a to 6d are diagrams employed to explain the pattern contracting and enlarging operations according to the invention.

The pattern enlarging and contracting operations are explained more particularly with reference to FIGS. 6a through 6d. FIG. 6a shows the pattern data of three different colors which are recorded in the register 23, of which A is the darkest and B is the lightest.

1. Color A is darker than color B, so that the color boundary is shifted toward the darker color A by a predetermined distance as indicated at AE in FIG. 6b in order to compensate for the expanded bleeding. Then the lighter color B is enlarged toward the darker color A beyond the color boundary AE to ensure pattern linkage, defining the margin of the color B at BS of FIG. 6c.

Figure 6B:
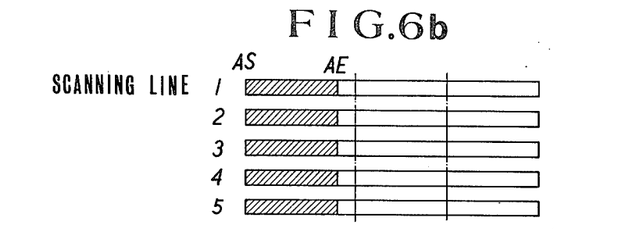
Figure 6C:
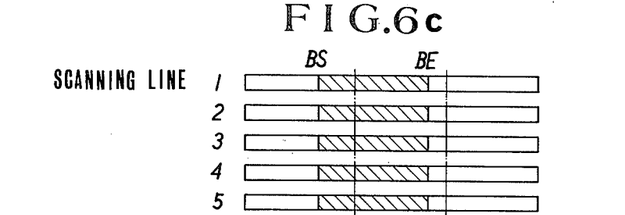
Figure 6D:
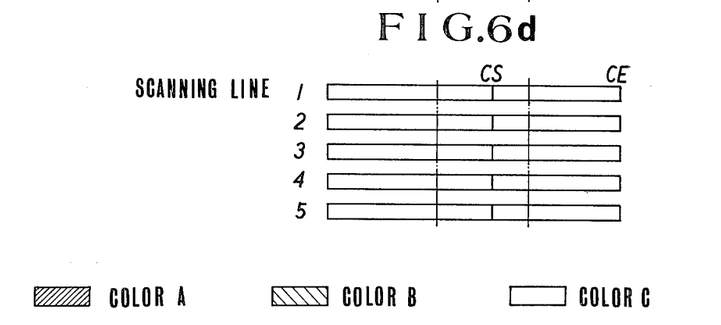

2. The boundary between the colors B and C undergoes similar shifting and enlarging operations, and the printing pattern data of the colors A, B and C on the respective scanning lines of FIG. 6b, 6c and 6d are reformed to occupy the respective places between AS and AE, between BS and BE, and between CS and CE before transmittance to an interpolating circuit 28.

By the operation of the pattern contraction and enlargement circuit 26, the respective patterns are contracted or enlarged in relation to the color of an adjoining pattern to adapt them to meet the various conditions which are usually required in actual printing operations in connection with dye bleeding and pattern linkage. In this regard, the existing systems are adapted to enlarge or contract a particular pattern in a predetermined width regardless of the color of an adjoining pattern. That is to say, it has thus far been difficult to enlarge or contract the patterns in relation with adjoining colors. According to the present invention, it becomes possible to obtain high quality color separation patterns due to the pattern processing on the basis of the relative color conditions of the respective patterns.

The fine line separation circuit 27 picks up the patterns which have a color the same as the ground from the register 23 for separating from the ground the fine lines on opposite sides of the ground color judging from their shapes. The fine lines of this nature may be left unseparated if desired. Printing designs sometimes have certain patterns hemmed with fine lines of a ground color to impart clarity to the design. The separation of the ground color fine lines is convenient especially when there arises a necessity for printing the fine lines in a different color to change the design effects.

Figure 7A:
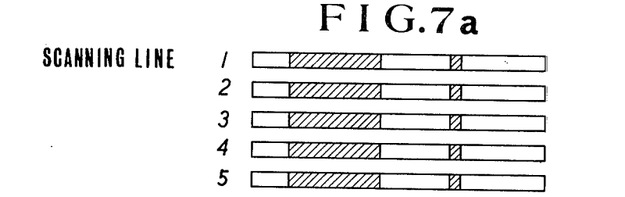
FIGS. 7a to 7c are diagrams employed to explain the fine line separating operations according to the invention.
Figure 7B:
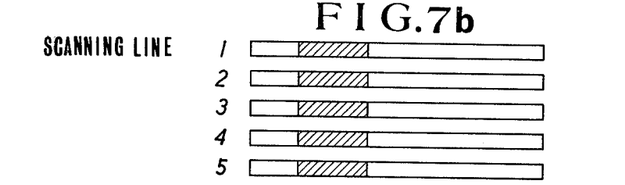
Figure 7C:
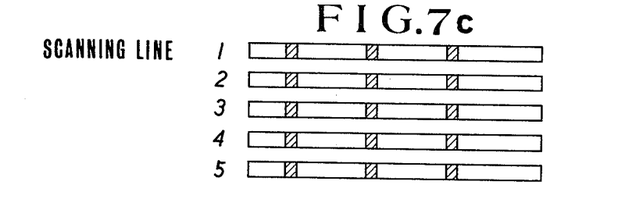

The operations for separating fine lines of the ground color are now discussed in greater detail with reference to FIGS. 7a to 7c. FIG. 7a shows diagrammatically the pattern data which are recorded in the pattern register 23, of which the hatched areas are the patterns of the ground color. The fine line separation circuit 27 picks up selectively only those pattern data which have the ground color and judges whether pattern data of a predetermined width to serve as a fine line can be formed on both sides of the picked-up ground color pattern. If it is possible to form pattern data of a fine line on opposite sides of the ground color pattern such as the one which is shown on the lefthand hatched pattern area in FIG. 7a, the pattern in question is divided into one intermediate pattern as shown by a hatched area in FIG. 7b and two fine line data as shown by the two hatched areas from the left in FIG. 7c. When a ground color has no room for forming the hem line patterns as in the case of the righthand hatched pattern area of FIG. 7a, the pattern is left as it is as shown by the righthand hatched pattern area of FIG. 7c.

It will be appreciated from the foregoing description that the fine line separating operation according to the invention can completely take the place of the manual labors which have thus far been required in separating the fine lines from the ground color patterns.

The pattern data in the register 23 are transmitted in a continuous form to an interpolating circuit 28 through the pattern contracting and enlarging circuit 26 and the fine line separating circuit 27. When the processed pattern data are output on a film, it is desirable to use pattern-connecting data (an interpolating coefficient) for the purpose of indicating an increased amount of patterns with a relatively small amount of data, contributing in a considerable degree to the reduction of the processing time. The interpolating circuit 28 establishes, based on the data recorded in the pattern register 23, an interpolating coefficient which indicates the position of the pattern on a reproducing film and the shape of the pattern to be reproduced, for interpolating the output data in consideration of three factors, that is to say, the color code, pattern location and interpolating coefficient. The results of interpolation are transmitted to a printing pattern register 29.

The printing pattern register 29 records as a second color signal train the pattern data which have been processed in the afore-mentioned various circuits for adapting the original color patterns to comply with the actual printing conditions. The operations in the color signal processing stage are thus completed and the second color signal train is recorded in an information storage means such as a magnetic tape, if desired.

The system in the subsequent tracing stage includes an output control circuit 30 which takes out printing pattern data of a particular color code from the second color signal train in the afore-mentioned printing pattern register 29 or the information storage means. The output control circuit 30 performs the functions of transmitting the printing pattern data of one color to a data reproducing circuit 31 and controlling a photo modulator circuit 32 and a film mounting drum 33. Such photomodulator circuits are known in the art, e.g. as disclosed by Noguchi et al in I.E.E.E. Transactions On Sonics and Ultrasonics, Vol. SU-20, No. Oct. 4, 1973, pages 365–370.

The data reproducing circuit 31 converts into film pattern signals the printing data which has been taken out from the printing pattern register 29 by the output control circuit 30, and the film pattern signals are transmitted to film pattern registers $34_1$ to $34_n$. In order to synchronize the processing time by the data reproducing circuit 31 with the rotation of the film mounting drum 33, the film pattern registers $34_1$ to $34_n$ are constituted by a number of blocks each having a memory capacity large enough to record a film pattern signal train of one scanning line. The film pattern signals indicate output or non-output of a particular color and are in the form of an on-off signal train representing one dot by a bit unit.

The photo modulator circuit 32 reads out the film pattern signal train which is recorded in the film pattern register 34 and changes the diffraction angle of a laser beam which is projected from a laser light source 35 in accordance with the read-out data, thereby irradiating particular areas of a photosensitive film which is mounted on the film drum 33. Thus, by synchronizing the operation of the photo modulator which takes out signals from the film pattern signal train in the register 34 with the rotational movement of the film drum 33 under the control of the output control circuit 30, a printing pattern of a selected color may be produced on the photosensitive film on the scanning drum 33. In other words, the film irradiation by the laser beam which is projected from the laser light source 35 is on-off controlled according to the film pattern signals by the photo modulator circuit 32 which is adapted to change the diffraction angle of the laser beam in response to the film pattern signals. As a result, a pattern of one color which is contained in the original design is produced on the photosensitive film by a combination of black and white dots which are formed by irradiation and non-irradiation of the laser beam. The printing pattern films of the respective colors in the original design can thus be prepared on separate films by repeating the above-described operations.

What is claimed is:

1. In a method for preparing color separation printing pattern films suitable for use in an additive color printing process by irradiating a multi-colored original design with light; scanning the original design to detect optical energy levels of reflected red, blue and green components of quantized picture elements in said design; generating picture element data representative of the red, green and blue components thereof; and using said data to control the formation of a black and white pattern on a photosensitive film corresponding to a primary color content in said original design, the improvement which comprises:

a. sequentially comparing picture element data to determine the existence of a predetermined differential in optical energy levels therebetween;
b. recording standard picture element data not exceeding said differential as a single data group coded with the number of said picture elements and the representative optical energy level thereof;
c. comparing non-standard picture element data exceeding said differential with a series of prerecorded picture element data groups characteristic of changes in said original design due to unevenly applied color, fidelity of the system, irregular original surfaces, overlapped colors and color boundaries;
d. recording a non-standard picture element data pattern as a single data group coded with the number of said picture elements and a change identification code representative of a corresponding prerecorded picture element data pattern;
e. comparing said standard single data groups with sample color data to identify the color thereof and encoding a color identification therewith;
f. interpolating non-standard picture element data groups into preceding and succeeding standard picture element data groups with a predetermined interpolation coefficient based on said change identification code; and
g. using the resultant modified picture element data to modulate the irradiation and non-irradiation of a laser beam on said photosensitive film to form said black and white pattern thereon.

2. A method according to claim 1, further comprising uniformizing the picture element data of fine lines in said original design to a predetermined width and correspondingly modifying the picture element data of adjacent colors as necessary to compensate for the reduction or enlargement of fine line width.

3. A method according to claim 1, further comprising identifying the color of adjacent picture element data groups as being respectively dark or light; reducing the run length of said dark color adjacent said light color by a first given distance; and increasing the run length of said light color adjacent said dark color by a second given distance which is greater than said first given distance so that the expanded run length of said light color overlaps the contracted run length of said dark color to compensate for dye bleeding and ensure pattern linkage in a printed pattern.

4. A method according to claim 1, further comprising comparing the run lengths of picture element data groups representative of a ground color pattern segment with a predetermined standard to determine if said run lengths are sufficient to hem said ground color pattern segment with fine lines having a predetermined width whereby to impart clarity to the ground color design; and separating each picture element data group having at least said predetermined run length into an intermediate pattern portion data group and a uniform width fine line portion data group on each side thereof.

5. A method according to claim 1, wherein said interpolation coefficient is indicative of pattern position of a reproducing film as well as pattern shape.

6. A method according to claim 1, further comprising the steps of providing samples of all colors contained in said original; feeding sampled color data to sample color registers which have been previously recorded with data indicative of the respective original colors along with corresponding color codes for recordation in a corresponding register; and identifying colors of said picture element data groups by comparison with said data in said sample color registers.

7. A method according to claim 2, further comprising identifying the color of adjacent picture element data groups as being respectively dark or light; reducing the run length of said dark color adjacent said light color by a first given distance; and increasing the run length of said light color adjacent said dark color by a second given distance which is greater than said first given distance so that the expanded run length of said light color overlaps the contracted run length of said dark color to compensate for dye bleeding and ensure pattern linkage in a printed pattern.

8. A method according to claim 7, further comprising comparing the run lengths of picture element data groups representative of a ground color pattern segment with a predetermined standard to determine if said run lengths are sufficient to hem said ground color pattern segment with fine lines having a predetermined width whereby to impart clarity to the ground color design; and separating each picture element data group having at least said predetermined run length into an intermediate pattern portion data group and a uniform width fine line portion data group on each side thereof.

9. A method according to claim 8, wherein said interpolation coefficient is indicative of pattern position of a reproducing film as well as pattern shape.

* * * * *